(12) United States Patent
Schneider

(10) Patent No.: US 12,728,371 B2
(45) Date of Patent: Sep. 8, 2026

(54) DISC FILTER

(71) Applicant: Valeri Schneider, Zug (CH)

(72) Inventor: Valeri Schneider, Zug (CH)

(73) Assignees: Valeri Schneider, Zug (CH); Viktor Landel, Waldbrol (DE); Sergiy Turevskyy, Hennef (DE)

( * ) Notice: Subject to any disclaimer, the term of this patent is extended or adjusted under 35 U.S.C. 154(b) by 335 days.

(21) Appl. No.: 18/582,199

(22) Filed: Feb. 20, 2024

(65) Prior Publication Data

US 2025/0262576 A1 Aug. 21, 2025

(51) Int. Cl.
*B01D 33/23* (2006.01)
*B01D 46/00* (2022.01)

(52) U.S. Cl.
CPC ......... *B01D 33/23* (2013.01); *B01D 46/0005* (2013.01)

(58) Field of Classification Search
CPC ............................ B01D 33/23; B01D 46/0005
See application file for complete search history.

(56) References Cited

U.S. PATENT DOCUMENTS

2012/0103890 A1* 5/2012 Larsson ................ B01D 33/23 210/232
2020/0282345 A1 9/2020 Jibert et al.

FOREIGN PATENT DOCUMENTS

| | | | |
|---|---|---|---|
| EP | 2 514 500 A1 | 10/2012 | |
| EP | 2 427 253 B1 | 7/2014 | |
| EP | 2 244 802 B1 | 4/2018 | |
| EP | 3 932 515 A1 | 1/2022 | |
| KR | 101039326 B1 * | 6/2011 | ............ B01D 33/21 |

OTHER PUBLICATIONS

KR_101039326_B1 English translation (Year: 2011).*

* cited by examiner

*Primary Examiner* — Terry K Cecil
(74) *Attorney, Agent, or Firm* — Pauley Erickson & Swanson

(57) ABSTRACT

A disc filter including a centrally positioned drum and at least one filter disc positioned on the drum extending in a filter plane, which has a plurality of filter segments protruding radially from the drum, each of which has a closed filter frame with two radially protruding frame struts fastened to the drum, a covering profile that connects the frame struts at the radially outer end, and filter inserts mounted in the filter frame. The filter segments in the filter plane are positioned spaced apart from one another on the drum so that they form an open space between adjacent filter segments and each open space accommodates intermediate filter inserts, which are covered at the radially outer end by covering profiles that span the open space at the radially outer end, and the covering profiles are continuations of one another along a closed circular path, forming a covering ring.

7 Claims, 2 Drawing Sheets

DISC FILTER

BACKGROUND OF THE INVENTION

Field of the Invention

This invention relates to a disc filter including a centrally positioned drum and at least one filter disc positioned on the drum extending in a filter plane, which includes a plurality of filter segments protruding radially from the drum, each of which has a closed filter frame with two radially protruding frame struts fastened to the drum, which are connected at the radially outer end by an arc-shaped connecting strut, and have filter inserts mounted in the filter frame as well as covering profiles that cover the filter inserts at the radially outer end.

Discussion of Related Art

Disk filters of the type mentioned above are known and are used, for example, to separate out fine particulate solids in wastewater treatment. An example of such a disc filter is described in European Patent Reference EP 2 244 802 B1.

Often, a modular design composed of filter frames and filter inserts mounted in them is selected for the construction of the individual filter discs in order to limit the manufacturing cost of the often large-format disc filters and allow inexpensive replacement of individual modules when they fail due to wear. For example, European Patent References EP 3 932 515 A1 and EP 2 427 253 B1 disclose such modularly designed filter discs, which are made up of modules arranged in a row around the circumference of the drum to form a filter disc that completely encircles the drum. But the structural complexity required to create the individual filter frames for each module is considerable, which would appear to be in need of improvement.

One object of this invention, thus, is to provide a disc filter of the type mentioned at the beginning, which features a simpler structural design.

SUMMARY OF THE INVENTION

To attain the stated object and other objects, this invention provides an embodiment of a disc filter according to the features described in this specification and the claims. Some advantageous embodiments and modifications of this invention are disclosed in the dependent claims.

According to this invention, the filter segments in the filter plane are positioned spaced apart from one another on the drum so that they form an open space between adjacent filter segments and each open space accommodates intermediate filter inserts, which are covered at the radially outer end by covering profiles that span the open space at the radially outer end, and the covering profiles are continuations of one another along a closed circular path, forming a covering ring. In this way, the number of required filter segments with filter frames that is necessary to construct a complete filter disc is reduced by half. Viewed around the circumference of the filter disc, filter segments with closed filter frames and filter inserts accommodated therein alternate with open spaces with intermediate filter inserts accommodated therein and together, they make up a filter disc that encircles the drum. An intermediate filter insert is accommodated between each pair of adjacent filter segments, which each accommodate a respective filter insert.

In order to reduce the number of parts and to enable a uniform structure of the disc filter according to this invention, in one embodiment of this invention, the filter inserts and intermediate filter inserts are embodied identically, for example they are freely interchangeable with one another.

According to another embodiment of this invention, the filter inserts and intermediate filter inserts each have two filter elements that are congruently positioned and spaced apart from each other in the axial direction of the drum, which define a filter chamber both inside the filter frame and between two adjacent filter frames, through which a liquid to be cleaned can flow.

According to another embodiment of this invention, each filter element can have a filter cloth suspended in a support structure such as a wire frame. The filter cloths can, for example, be constructed based on synthetic fibers such as polyester or polytetrafluoroethylene. The filter cloths can also be made of stainless steel wires. They are preferably acid-proof and back-washable. Depending on the specific application, the filter cloths have filter openings in the range from 10 to 50 μm and in microfiltration applications, even in the range from only about 10 to 20 μm.

According to this invention, the filter frames of the filter segments each comprise two one-part or multi-part frame struts fastened to the drum that are connected to one another by connecting struts at the radially inner end and/or radially outer end relative to the drum. According to one embodiment of this invention, on their insides facing each other and on their outsides facing the adjacent open space, the frame struts comprise or are provided with receiving slots into which the filter inserts and intermediate filter inserts, respectively, can be inserted in order to affix them peripherally in the region of the filter frames and open spaces. If the filter inserts and intermediate filter inserts comprise two filter elements spaced apart from each other, then two receiving slots extending parallel to each other can be respectively provided in the insides and outsides of the frame struts.

In addition, covering profiles can be fastened at the radially outer ends of the filter frames, which cover the filter inserts accommodated in the filter frames of the filter segments as well as the intermediate filter inserts accommodated between adjacent filter segments and are continuations of one another along a closed circular path, forming a covering ring. This makes it possible to obtain a uniform and resilient radially outer edge of the filter discs. In order to replace an individual filter insert or intermediate filter insert or an associated filter element, it is only necessary to remove the associated covering profile so that the corresponding filter insert or intermediate filter insert can then be withdrawn radially outward and replaced with a new filter insert or intermediate filter insert.

BRIEF DESCRIPTION OF THE DRAWINGS

Other embodiments and details of this invention are explained below based on the drawings, which show an exemplary embodiment, wherein.

DETAILED DESCRIPTION OF THE INVENTION

Figure 1:
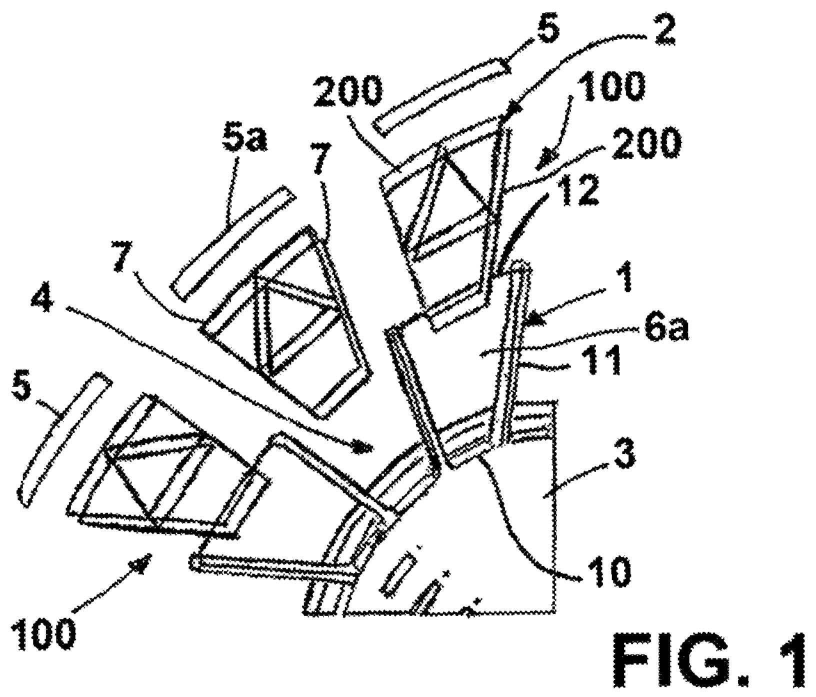
FIG. 1 shows a perspective detail view of a disc filter according to this invention.

FIG. 1 shows a detail of the design of a disc filter of the kind that can be used, for example, to separate out algae or plankton impurities in a water flow or also for tertiary or secondary filtration of municipal wastewater.

The central component of the disc filter shows a drum 3, for example made of a piece of stainless steel sheet, which is rolled into a cylinder and welded and by a rotary drive unit that is not shown, can be rotated around its longitudinal axis when needed and serves to convey a flow of water. The cylindrical wall of the drum is provided with regularly arranged openings through which the water flow can pass in a radial direction.

Figure 2:
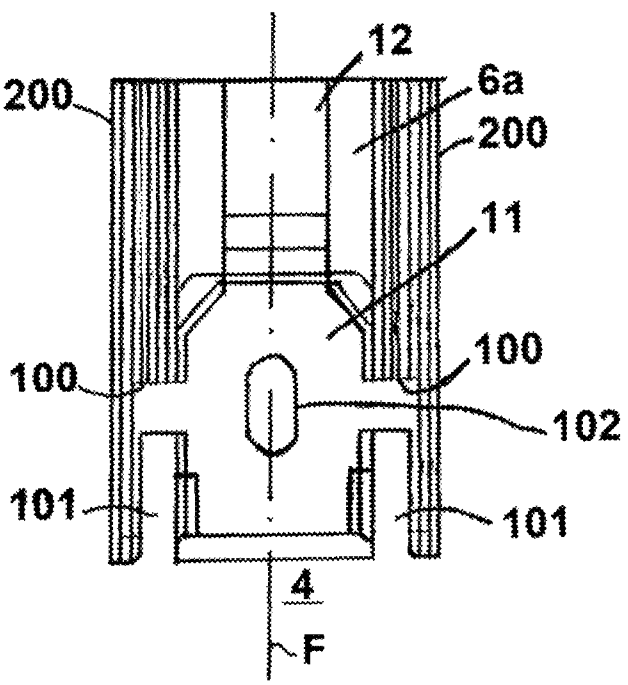
FIG. 2 shows a view of a frame strut of the disc filter according to this invention with the covering profile removed.

To form a disc filter, filter frames 1 are fastened near or in the region of the openings in such a way that they protrude from the drum in the radial direction. Each filter frame 1 has two frame struts 11 whose radially inner ends are fastened to a combined base plate 10 on the drum circumference these frame struts 11 protrude radially outward and are connected at the radially outer end by an arc-shaped connecting strut 12 so that together, they form a closed filter frame 1 with an inner receiving space 6*a*, also see FIG. 2. Each filter frame 1 is a component of a filter segment 100 or filter module and is a segment-like component of a filter disc extending around the circumference of the drum in a filter plane F. The filter frame 1 and its above-explained parts can, for example, comprise or be made of cast aluminum or a suitable possibly fiber-reinforced plastic.

Figure 3:
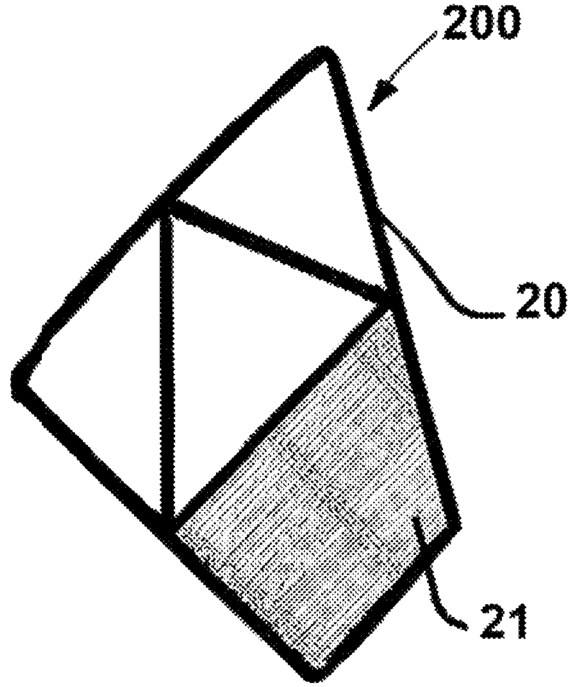
FIG. 3 shows a perspective view of a single filter element.

In the region of or near the insides of the frame struts 11 facing each other in a filter frame 1, two receiving grooves 100 are provided, which are spaced apart from each other in the axial direction of the drum 3 and extend parallel to each other in the radial direction, by which a filter insert 2 comprising two congruently positioned filter elements 200 are inserted into the inner receiving space 6*a*. Each filter element 200 comprises a frame 20 and a filter cloth 21 suspended therein, for example comprising a polyester woven with a mesh width of 10 to 50 μm, as shown in FIG. 3. The filter elements 200 of the filter insert 2 can be individually inserted into the filter frame 1 and individually replaced. At the radially outer end, a covering profile 5 is mounted as a closure onto the filter frame 1 with inserted filter elements 200, for example is screwed to the frame struts 11 in a central bore 102. In this way, a filter insert 2 comprising two congruent filter elements 200 spaced apart from each other is inserted into the inside of the receiving space 6*a* of the filter frame 1 and is covered by the covering profile 5 at the radially outer end.

The adjacent filter segment 100 with the filter frame 1 that is the closest to the depicted filter segment 100 with the filter frame 1 does not directly adjoin the other filter segment 100 in the circumference direction of the drum 3 viewed in the filter plane F, but is instead positioned spaced apart from it on the drum 3 so that an open space 4 remains between adjacent filter segments 100. This open space 4 is dimensioned so that other filter elements 2 serving as intermediate filter inserts 7 can be inserted between the filter segments 100 without having separate associated filter frames 1. For this purpose, the filter struts 11 of the filter frames 1 also have corresponding receiving grooves 101 in their respective outsides facing the open space 4, into which the filter elements 2 of the intermediate filter inserts 7 can be inserted and can be covered with a closing profile 5*a*.

In particular, the filter elements 2 of the filter segments 100 and of the intermediate filter inserts 7 are embodied to be the same, for example identical and interchangeable with one another. The number of filter segments 100 with closed filter frames 1 required to form a continuous filter disc encompassing the circumference of the drum 3 can thus be reduced by half.

If all of the filter inserts and intermediate filter inserts are mounted in the receiving spaces 6*a* and open spaces 4 and are covered in alternating fashion by closing profiles 5, 5*a*, this achieves a filter disc that is situated in the filter plane (F) and extends continuously around the circumference and is surrounded by an outer closing ring formed by the closing profiles 5, 5*a* that are continuations of one another. Naturally, a plurality of such filter discs can be positioned on the drum 3.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

The invention claimed is:

1. A disc filter comprising a centrally positioned drum and at least one filter disc positioned on the drum extending in a filter plane having a plurality of filter segments protruding radially from the drum, each of which has a closed filter frame with two radially protruding frame struts fastened to the drum, which are connected at a radially outer end by an arc-shaped connecting strut and have filter inserts mounted in the filter frame and covering profiles that cover the filter inserts at the radially outer end, the filter segments in the filter plane positioned spaced apart from one another on the drum so that they form an open space between adjacent filter segments and each open space accommodates intermediate filter inserts, which are covered at the radially outer end by covering profiles that span the open space at the radially outer end, and the covering profiles are continuations of one another along a closed circular path forming a covering ring.

2. The disc filter according to claim 1, wherein the filter inserts and intermediate filter inserts are embodied identically.

3. The disc filter according to claim 2, wherein the filter inserts and intermediate filter inserts each have two filter elements that are congruently positioned and spaced apart from each other in the axial direction of the drum.

4. The disc filter according to claim 3, wherein the filter elements each has a filter cloth suspended in a support structure.

5. The disc filter according to claim 4, wherein on insides facing each other and on outsides facing the adjacent open space, the frame struts have receiving grooves for the filter inserts and intermediate filter inserts, respectively.

6. The disc filter according to claim 1, wherein the filter inserts and intermediate filter inserts each have two filter elements that are congruently positioned and spaced apart from each other in the axial direction of the drum.

7. The disc filter according to claim 1, wherein on insides facing each other and on outsides facing the adjacent open space, the frame struts have receiving grooves for the filter inserts and intermediate filter inserts, respectively.

* * * * *